US007026793B2

(12) United States Patent
Park

(10) Patent No.: US 7,026,793 B2
(45) Date of Patent: Apr. 11, 2006

(54) SUPER ELECTROCHEMICAL CAPACITOR INCLUDING ELECTRODE PLATES HAVING DIFFERENT QUANTITIES OF ELECTRIC CHARGES

(75) Inventor: Chul-Wan Park, Seoul (KR)

(73) Assignee: Shin Corporation, (KR)

( * ) Notice: Subject to any disclaimer, the term of this patent is extended or adjusted under 35 U.S.C. 154(b) by 0 days.

(21) Appl. No.: 10/913,720

(22) Filed: Aug. 6, 2004

(65) Prior Publication Data
US 2005/0134233 A1 Jun. 23, 2005

(30) Foreign Application Priority Data
Dec. 6, 2003 (KR) ............... 10-2003-0088345

(51) Int. Cl.
*H02J 7/00* (2006.01)
(52) U.S. Cl. ..................................... 320/167
(58) Field of Classification Search ............. 320/167, 320/166; 399/285
See application file for complete search history.

(56) References Cited

U.S. PATENT DOCUMENTS 5,592,271 A * 1/1997 Parker et al. ............ 399/285
5,827,783 A * 10/1998 Hsia et al. ............... 438/735
5,851,898 A * 12/1998 Hsia et al. ............... 438/398
6,222,723 B1 * 4/2001 Razoumov et al. ......... 361/503

OTHER PUBLICATIONS http://www.electricity storage.org/tech/technologies_ technologies_ supercapacitor.htm.*

* cited by examiner

Primary Examiner—Pia Tibbits
(74) Attorney, Agent, or Firm—Cantor Colburn LLP

(57) ABSTRACT

Provided is a super electrochemical capacitor including two electrode plates having the same size but different quantities of electric charges or electric charge densities without increasing the volume of the capacitor to increase the quantity of electric charges, capacitance and usable voltage range of the capacitor, to thereby obtain high voltage and super capacitance. The super electrochemical capacitor includes two electrode plates having different quantities of electric charges and similar sizes. The two electrode plates are spaced apart from each other by a dielectric layer or collector layer. The two electrode plates have different quantities of electric charges or electric charge densities while maintaining the sizes thereof. The two electrode plates have different porosities or bulk densities such that the electrode plates have different quantities of electric charges or electric charge densities. The ratio of the quantity of electric charges or electric charge densities between the two electrode plates is 1:0.2 to 0.95.

8 Claims, 3 Drawing Sheets

HALF-CELL TYPE EDLC CHARACTERISTIC OF EACH ELECTRODE PLATE

CHARACTERISTIC OF COMPLETE EDLC INCLUDING LEFT ELECTRODE PLATE
(LEFT AND RIGHT ELECTRODE PLATES IDENTICAL TO EACH OTHER)

HALF-CELL TYPE EDLC CHARACTERISTIC OF EACH ELECTRODE PLATE  Q

CHARACTERISTIC OF EDLC INCLUDING LEFT AND RIGHT ELECTRODE PLATES IDENTICAL TO EACH OTHER

CHARACTERISTIC OF COMPLETE EDLC INCLUDING LEFT ELECTRODE PLATE
(LEFT AND RIGHT ELECTRODE PLATES ARE DIFFERENT FROM EACH OTHER)

SUPER ELECTROCHEMICAL CAPACITOR INCLUDING ELECTRODE PLATES HAVING DIFFERENT QUANTITIES OF ELECTRIC CHARGES

BACKGROUND OF THE INVENTION

1. Field of the Invention

The present invention relates to a super electrochemical capacitor (typically EDLC) and, more particularly, to a super electrochemical capacitor including electrode plates having different quantities of electric charges, which increases electric charge and capacitance and raise a usable voltage range to thereby obtain high-voltage super capacitance.

2. Background of the Related Art

A capacitor or a condenser is generally classified into an electrostatic capacitor, an electrolytic capacitor and an electrochemical capacitor. The electrostatic capacitor includes a ceramic capacitor, a glass capacitor, a mica capacitor and so on and generally has a capacitance of approximately 1.0 to 10 μF. The electrolytic capacitor includes an aluminum electrolytic capacitor and a tantalum electrolytic capacitor. The electrolytic capacitor has a capacitance of approximately ten times the capacitance of the electrostatic capacitor.

The electrochemical capacitor, which is also called a super capacitor, includes an electric double layer capacitor (EDLC), a metal oxide pseudo capacitor and a hybrid super capacitor, which have an improved capacitance of approximately 1 mF to 3000 F.

In the super electrochemical capacitor, powder-type activated carbon is mixed with carbon black that is a conductive material and the mixture is attached onto a collector to form an electrode. Here, a binder is added to the electrode to bind the activated carbon, conductive material and collector to one another. Polysaccharide and fluoride-based binders are generally used as the binder. The binder is divided into a water-soluble binder and an organic binder depending on a solvent dissolving the binder. A process of forming the electrode depends on the kind of binder.

For the purpose of fabricating the super electrochemical capacitor, a method of forming a metal collector on a carbon fiber or an activated carbon fiber to fabricate a polarizing electrode, a method of compressing carbon paste on a conductive rubber or a metal collector, and a method of coating a slurry containing activated carbon powder on a metal collector have been developed.

FIG. 1 is a perspective view of a conventional capacitor 10, and FIG. 2 is a cross-sectional view of the conventional capacitor 10. Referring to FIGS. 1 and 2, two electrode plates 11a and 11b are formed to have the same size and spaced apart from each other by a dielectric layer or a collector layer 12 formed therebetween.

The collector layer 12 can use a condenser grade material, polymer film, or a hetero-structure complex of both of them. The capacitor 10 is fabricated in such a manner that the collector layer 12 is interposed between the two electrode plates 11a and 11b, and the collector layer 12 and electrode plate are alternately arranged repeatedly, as shown in FIG. 2.

Each of the electrode plates has the collector layer 12 on both sides thereof. The stacked electrode plates and collector layers are dipped in a dielectric solution. Halogen biphenyl was generally used as the dielectric solution.

However, the volume of the conventional capacitor should also be increased in order to increase the capacitance or voltage thereof because the two electrode plates of the capacitor have the same electric charge. Thus, a small-size capacitor cannot increase the electric charge and capacitance and make a usable voltage range large. Accordingly, a high-voltage super electrochemical capacitor cannot be realized. Furthermore, a small-sized capacitor having sufficient voltage and capacitance, which can comply with a technology trend toward the compact and slimness of electronic devices, could not be implemented.

SUMMARY OF THE INVENTION

Accordingly, the present invention has been made to solve the above problems occurring in the prior art, and it is an object of the present invention is to provide a super electrochemical capacitor including two electrode plates having the same size but different quantities of electric charges or electric charge densities without increasing the entire volume of the capacitor to increase electric charge, capacitance and usable voltage range of the capacitor, thereby obtaining high-voltage super capacitance.

To accomplish the above object, according to the present invention, there is provided a super electrochemical capacitor including two electrode plates having different quantities of electric charges, the two electrode plates having similar sizes and being spaced apart from each other by a dielectric layer or collector layer, wherein the two electrode plates have different quantities of electric charges or electric charge densities therein while maintaining the sizes thereof.

Preferably, the two electrode plates have different thicknesses such that the electrode plates have different quantities of electric charges or electric charge densities therein.

The ratio of the quantity of electric charges or electric charge densities between the two electrode plates is 1:0.2 to 0.95.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
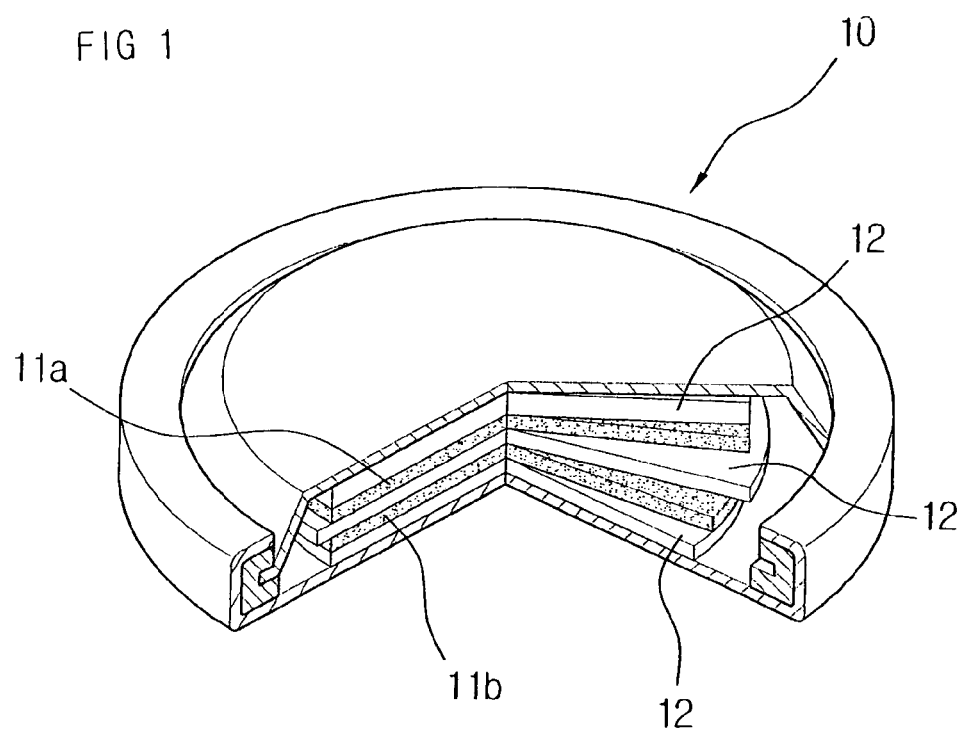
FIG. 1 is a perspective view of a conventional capacitor.
Figure 2:
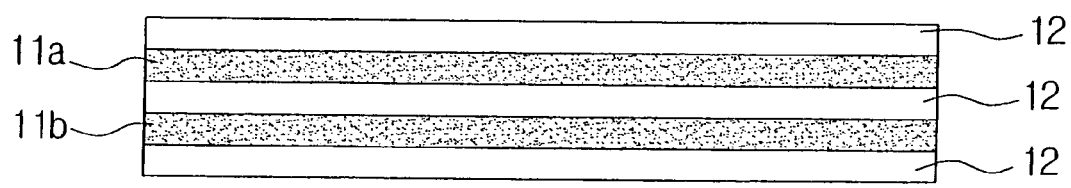
FIG. 2 is a cross-sectional view of the conventional capacitor.

A capacitor of the present invention includes two electrode plates 11a and 11b having similar sizes, which are spaced apart from each other by a dielectric layer or a collector layer 12 formed between them, similar to the conventional capacitor shown in FIG. 1. However, the two electrode plates of the capacitor according to the present invention have different quantities of electric charges while maintaining the sizes thereof.

Here, the two electrode plates may have the same thickness but different porosities or bulk densities such that the electrode plates have different quantities of electric charges or electric charge densities therein. Alternatively, the two electrode plates may have different thicknesses to have different quantities of electric charges or electric charge densities.

Figure 3:
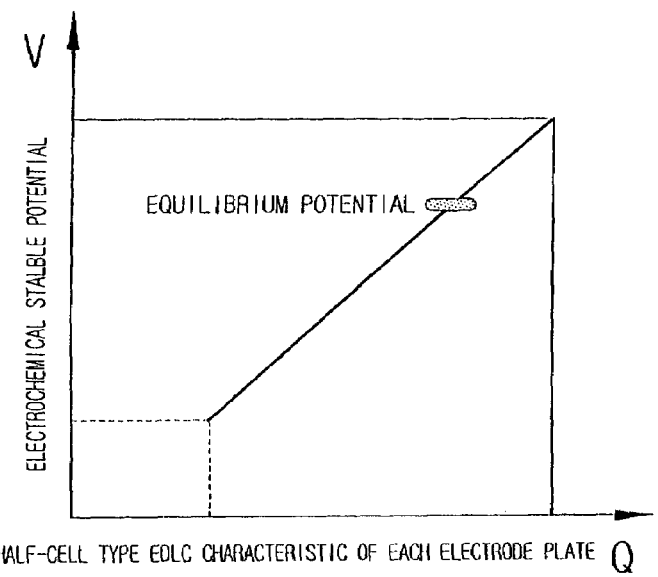
FIG. 3 is a graph showing Q-V characteristic of electrode plates when the electrode plates have the same quantity of electric charge.
Figure 4:
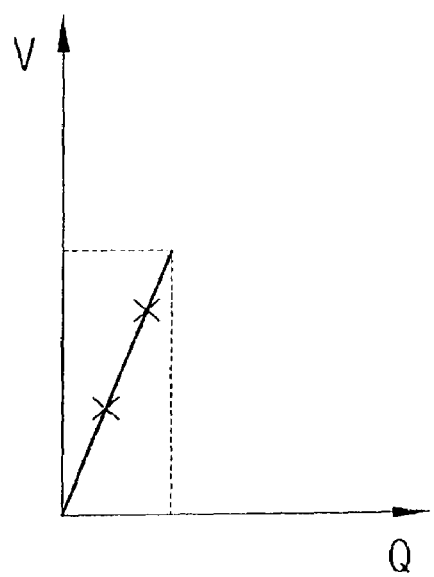
FIG. 4 is a graph showing Q-V characteristic of a super electrochemical capacitor including the electrode plates having the characteristic shown in FIG. 3.

FIGS. 3 and 4 show the quantity of electric charge and Q-V characteristics of the two electrode plates 11a and 11b. In FIGS. 3 and 4, V denotes voltage V, Q represents the quantity of electric charge mAh, and C denotes capacitance F. The capacitance C can be represented by $C=Q/V(F)$.

FIG. 3 is a graph showing Q-V characteristic of the two electrode plates 11a and 11b when the electrode plates have the same quantity of electric charge, and FIG. 4 is a graph showing Q-V characteristic of an ELDC including the electrode plates having the characteristic shown in FIG. 3.

Figure 5:
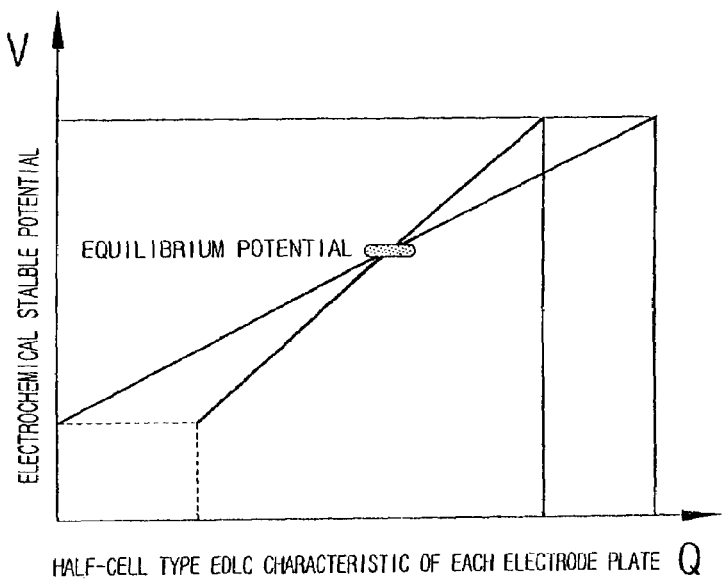
FIG. 5 is a graph showing Q-V characteristics of two electrode plates having different quantities of electric charges.
Figure 6:
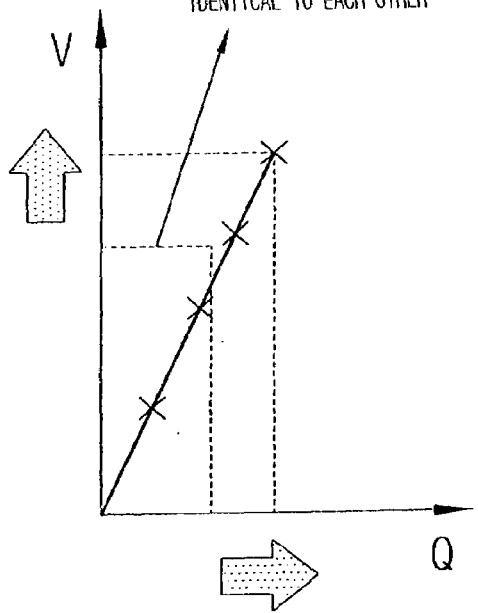
FIG. 6 is a graph showing Q-V characteristic of a super electrochemical capacitor including the electrode plates having the characteristic shown in FIG. 5.

FIG. 5 is a graph showing Q-V characteristics of the two electrode plates 11a and 11b having different quantities of electric charges, and FIG. 6 is a graph showing Q-V characteristic of an EDLC including the electrode plates having the characteristic shown in FIG. 5.

From the graphs of FIGS. 3, 4, 5 and 6, it can be known that the quantity of electric charge Q and capacitance C are increased and an electrochemical voltage stabilization region is widened when the two electrode plates 11a and 11b have different quantities of electric charges. This can produce a high-voltage EDLC.

Accordingly, the present invention can increase the quantity of electric charge and capacitance of the capacitor by making the electrode plates have different quantities of electric charges or electric charge densities while having same size without increasing the volume of the capacitor, as opposed to the conventional capacitor, which includes the electrode plates having the same quantity of electric charge so that the volume of the capacitor is also increased when the capacitance or voltage is increased.

Preferably, the ratio of the quantity of electric charge or electric charge densities between the two electrode plates 11a and 11b according to the present invention is 1:0.2 to 0.95 or 0.2 to 0.95:1.

It is also possible to form the two electrode plates 11a and 11b in different thicknesses such that the electrode plates have different quantities of electric charges or electric charge densities.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

As described above, the present invention can increase the quantity of electric charge and capacitance of a super electrochemical capacitor by forming electrode plates such that the electrode plates have the same size but different quantities of electric charges or electric charge densities without increasing the volume of the capacitor.

Furthermore, the present invention can provide a super electrochemical capacitor having improved quantity of electric charge and capacitance by making the electrode plates of the conventional capacitor structure have different thicknesses without changing the conventional capacitor structure. Accordingly, existing capacitor manufacturers can easily fabricate the super electrochemical capacitor according to the present invention. Moreover, the capacitor of the present invention can be easily fabricated and increase the capacitance and voltage thereof while maintaining a small size. Therefore, the present invention can provide a small-sized capacitor which can comply with a technology trend toward the compact and slimness of electronic devices.

What is claimed is:

1. A super electrochemical capacitor including:
   a first electrode plate having a first electric charge;
   a second electrode plate having a second electric charge;
   a dielectric layer disposed between the first and second electrode plates,
   wherein the first and second electrode plates each have a substantially identical shape, and quantities of the first and second charges are different from each other; and
   wherein the first and second electrode plates have different porosities from each other so that the first and second electrode plates have different quantities of electric charges from each other.

2. The super electrochemical capacitor as claimed in claim 1, wherein the first and second electrode plates have different thicknesses from each other.

3. The super electrochemical capacitor as claimed in claim 1, wherein the ratio of the quantity of electric charges between the first and second electrode plates is about 1:0.2 to 0.95.

4. The super electrochemical capacitor as claimed in claim 1, wherein the first and second electrode plates have different bulk densities from each other so that the first and second electrode plates have different quantities of electric charges from each other.

5. A super electrochemical capacitor including:
   a first electrode plate having a first electric charge density;
   a second electrode plate having a second electric charge density; and
   a dielectric layer disposed between the first and second electrode plates,
   wherein the first and second electrode plates have different sizes from each other and the first and second charge densities are different from each other; and
   wherein the first and second electrode plates have different porosities from each other so that the first and second electrode plates have different quantities of electric charges from each other.

6. The super electrochemical capacitor as claimed in claim 5, wherein the first and second electrode plates have different thicknesses from each other.

7. The super electrochemical capacitor as claimed in claim 5, wherein the first and second electrode plates have different bulk densities from each other so that the first and second electrode plates have different quantities of electric charges from each other.

8. The super electrochemical capacitor as claimed in claim 5, wherein the ratio of the charge densities between the first and second electrode plates is about 1:0.2 to 0.95.

* * * * *